(12) United States Patent
Rule et al.

(10) Patent No.: US 6,720,052 B1
(45) Date of Patent: *Apr. 13, 2004

(54) MULTILAYER POLYMERIC/INORGANIC OXIDE STRUCTURE WITH TOP COAT FOR ENHANCED GAS OR VAPOR BARRIER AND METHOD FOR MAKING SAME

(75) Inventors: Mark Rule, Atlanta, GA (US); Yu Shi, Conyers, GA (US); Thomas Gebele, Freigericht (DE); Helmut Grimm, Darmstadt (DE); Elisabeth Budke, Hurth (DE)

(73) Assignee: The Coca-Cola Company, Atlanta, GA (US)

( * ) Notice: Subject to any disclaimer, the term of this patent is extended or adjusted under 35 U.S.C. 154(b) by 217 days.

This patent is subject to a terminal disclaimer.

(21) Appl. No.: 09/645,639

(22) Filed: Aug. 24, 2000

(51) Int. Cl.[7] ............ B29D 22/00; B29D 23/00; B32B 1/08; B65D 1/40
(52) U.S. Cl. ............ 428/36.7; 428/35.7; 428/36.6; 428/36.9; 428/36.91; 220/62.12; 220/62.22
(58) Field of Search ............ 428/35.7, 35.2, 428/35.3, 35.4, 35.8, 35.9, 36.6, 36.7, 36.9, 36.91, 156, 161, 164, 448, 457, 458, 459, 460, 461, 462, 464, 469; 220/62.12, 62.22

(56) References Cited

U.S. PATENT DOCUMENTS

| | | | |
|---|---|---|---|
| 2,664,852 A | 1/1954 | Chadsey, Jr. ............ | 118/49 |
| 2,665,226 A | 1/1954 | Godley, II et al. ............ | 117/107 |
| 2,996,037 A | 8/1961 | Eng ............ | 118/49 |
| 3,016,873 A | 1/1962 | Baer et al. ............ | 118/49.1 |
| 3,442,686 A | 5/1969 | Jones ............ | 117/70 |
| 3,511,703 A | 5/1970 | Peterson ............ | 117/213 |
| 3,625,848 A | 12/1971 | Snapper ............ | 117/93.1 |

(List continued on next page.)

FOREIGN PATENT DOCUMENTS

| | | |
|---|---|---|
| DE | 1521421 | 12/1969 |
| DE | 3239131 A1 | 4/1984 |
| DE | 4026494 C2 | 5/1992 |
| DE | 4113221 A1 | 10/1992 |
| DE | 42 03 371 C1 | 2/1993 |
| DE | 40 06 457 C2 | 9/1993 |
| DE | 4305721 C1 | 7/1994 |

(List continued on next page.)

OTHER PUBLICATIONS

Deak et al., Mylar Polyester Films with Inorganic Glass Coatings, Society of Vacuum Coaters, 36th Annual Technical Conference Proceedings, 1993, pp. 318–323.*

*Primary Examiner*—Harold Pyon
*Assistant Examiner*—Michael C. Miggins
(74) *Attorney, Agent, or Firm*—Sutherland Asbill & Brennan LLP

(57) ABSTRACT

The coated multilayer structure comprising a polymeric base layer, an inorganic oxide gas barrier layer on a surface of the polymeric base layer, and a top coat on the inorganic oxide gas barrier layer, the top coat comprising a soluble compound capable of reducing the permeability of the multilayer structure to gas or vapor. A method for enhancing the gas or vapor barrier properties of a multilayer polymeric/inorganic oxide structure is also disclosed. According to one embodiment, SiOx coated polyethylene terephthalate containers are coated with a gas or vapor barrier enhancing top coat.

22 Claims, 1 Drawing Sheet

U.S. PATENT DOCUMENTS

| | | | |
|---|---|---|---|
| 4,230,068 A | | 10/1980 | Itoh et al. .................... 118/634 |
| 4,438,368 A | | 3/1984 | Abe et al. ...................... 315/39 |
| 4,448,802 A | | 5/1984 | Buhl et al. ..................... 427/42 |
| 4,528,234 A | * | 7/1985 | Kaiho et al. ................. 428/216 |
| 4,532,150 A | | 7/1985 | Endo et al. .................... 427/39 |
| 4,532,196 A | | 7/1985 | Yasui et al. ................... 430/31 |
| 4,552,791 A | * | 11/1985 | Hahn .......................... 428/35 |
| 4,573,429 A | | 3/1986 | Cobbs, Jr. et al. .......... 118/322 |
| 4,615,916 A | | 10/1986 | Henderson .................. 427/255 |
| 4,634,605 A | | 1/1987 | Wiesmann .................. 427/249 |
| 4,661,395 A | | 4/1987 | Akao .......................... 428/213 |
| 4,697,974 A | | 10/1987 | Eltoukhy .................... 414/331 |
| 4,749,625 A | | 6/1988 | Obayashi et al. ........... 428/624 |
| 4,752,426 A | | 6/1988 | Cho ............................ 264/22 |
| 4,765,273 A | | 8/1988 | Anderle ...................... 118/729 |
| 4,824,545 A | | 4/1989 | Arnold et al. ............... 204/298 |
| 4,849,088 A | | 7/1989 | Veltrop et al. .............. 204/298 |
| 4,857,401 A | | 8/1989 | Sieverding .................. 428/336 |
| 4,888,199 A | | 12/1989 | Felts et al. ..................... 427/18 |
| 4,902,531 A | | 2/1990 | Nakayama et al. ........... 427/39 |
| 4,917,786 A | | 4/1990 | Ehrich .................... 240/192.38 |
| 4,919,968 A | | 4/1990 | Buhl et al. ..................... 427/37 |
| 4,975,168 A | | 12/1990 | Ohno et al. ............. 204/192.13 |
| 5,084,356 A | * | 1/1992 | Deak et al. ................. 428/458 |
| 5,085,904 A | * | 2/1992 | Deak et al. ................. 428/35.7 |
| 5,091,210 A | | 2/1992 | Mikoshiba et al. ........... 427/39 |
| 5,096,558 A | | 3/1992 | Ehrich .................... 204/192.38 |
| 5,112,644 A | | 5/1992 | Seddon et al. ................ 427/38 |
| 5,215,640 A | | 6/1993 | Buhl et al. .............. 204/192.38 |
| 5,232,755 A | * | 8/1993 | Komiya et al. .......... 428/36.91 |
| 5,250,328 A | | 10/1993 | Otto ........................... 427/535 |
| 5,298,149 A | | 3/1994 | Kawamura et al. ......... 205/112 |
| 5,308,649 A | | 5/1994 | Babacz ....................... 427/562 |
| 5,308,950 A | | 5/1994 | Ramm et al. ........... 219/121.43 |
| 5,364,666 A | | 11/1994 | Williams et al. ............ 427/579 |
| 5,374,314 A | | 12/1994 | Babacz ....................... 427/579 |
| 5,378,510 A | | 1/1995 | Thomas et al. ............. 427/563 |
| 5,387,326 A | | 2/1995 | Buhl et al. .............. 204/192.38 |
| 5,429,729 A | | 7/1995 | Kamei et al. ........... 204/192.62 |
| 5,437,895 A | | 8/1995 | Kodama et al. ............ 427/578 |
| 5,462,779 A | | 10/1995 | Misiano et al. ............ 428/34.7 |
| 5,468,520 A | | 11/1995 | Williams et al. ............ 427/579 |
| 5,510,155 A | | 4/1996 | Williams et al. ............ 427/532 |
| 5,521,351 A | | 5/1996 | Mahoney .................. 214/121.59 |
| 5,531,060 A | | 7/1996 | Fayet et al. .................... 53/426 |
| 5,558,720 A | | 9/1996 | Sarraf et al. ................ 118/726 |
| 5,565,248 A | | 10/1996 | Plester et al. ............... 427/571 |
| 5,616,369 A | | 4/1997 | Williams et al. ............ 427/536 |
| 5,651,867 A | | 7/1997 | Kokaku et al. ........ 204/298.25 |
| 5,662,741 A | | 9/1997 | Ehrich .................. 118/723 VE |
| 5,670,224 A | | 9/1997 | Izu et al. ................... 428/35.8 |
| 5,677,010 A | | 10/1997 | Esser et al. ................. 427/489 |
| 5,691,007 A | | 11/1997 | Montgomery ............... 427/576 |
| 5,704,983 A | | 1/1998 | Thomas et al. ....... 118/723.4 P |
| 5,948,224 A | | 9/1999 | Signer et al. .......... 204/298.08 |
| 6,132,562 A | | 10/2000 | Baumecker et al. ... 204/192.12 |
| 6,223,683 B1 | | 5/2001 | Plester et al. ......... 118/723 VE |

FOREIGN PATENT DOCUMENTS

| | | |
|---|---|---|
| DE | 4343042 C1 | 3/1995 |
| DE | 4412906 C1 | 7/1995 |
| DE | 196 00 993 A1 | 8/1996 |
| DE | 44 44 763 C2 | 11/1996 |
| DE | 195 46 827 A1 | 6/1997 |
| EP | 0113555 A1 | 7/1984 |
| EP | 0302813 A3 | 2/1989 |
| EP | 0376614 A1 | 7/1990 |
| EP | 0 460 796 B1 | 4/1991 |
| EP | 0 460 796 A2 | 4/1991 |
| EP | 0460966 A2 | 12/1991 |
| EP | 0468864 A1 | 1/1992 |
| EP | 0 535 810 A1 | 9/1992 |
| EP | 0507351 A2 | 10/1992 |
| EP | 0 438 627 B1 | 5/1995 |
| EP | 0709485 A1 | 5/1996 |
| EP | 0721977 A1 | 7/1996 |
| EP | 0 785291 A1 | 7/1997 |
| EP | 0 0550 039 B1 | 3/1998 |
| GB | 2 139 647 A | 11/1984 |
| GB | 2210826 A | 6/1989 |
| GB | 2 263 472 A | 1/1992 |
| GB | 2246794 A | 2/1992 |
| GB | 2246795 A | 2/1992 |
| JP | 57169088 | 10/1982 |
| JP | 61104075 | 5/1986 |
| JP | 63243264 | 10/1988 |
| JP | 63312968 | 12/1988 |
| JP | 02218064 | 5/1990 |
| JP | 08092764 | 4/1996 |
| JP | 2000212302 | 8/2000 |
| WO | WO 92-12275 | 7/1992 |
| WO | WO 92/03841 | 2/1993 |

* cited by examiner

MULTILAYER POLYMERIC/INORGANIC OXIDE STRUCTURE WITH TOP COAT FOR ENHANCED GAS OR VAPOR BARRIER AND METHOD FOR MAKING SAME

TECHNICAL FIELD

This invention relates to multilayer structures comprising a polymeric layer and an inorganic oxide gas or vapor barrier layer such as plastic containers coated with a inorganic oxide barrier layer. More particularly, this invention relates to plastic beverage containers and enhancing the gas or vapor barrier properties of the container. Still more particularly, this invention is particularly applicable to PET/SiOx structures, such as rigid PET containers that have been coated on the exterior with a thin SiOx layer.

BACKGROUND OF THE INVENTION

Polymeric materials have numerous advantages as packaging materials for food and beverages. They are lightweight, impact resistant, and easily shaped. Accordingly, they have enjoyed widespread popularity. Unlike glass and metal, however, all polymers exhibit a measurable degree of permeability to gases and vapors. This deficiency inherently limits the use of polymers in more demanding applications, especially where oxygen ingress or carbon dioxide loss affects the quality of the contained food or beverage.

Numerous technologies have been developed to decrease the permeability of polymers, and thus increase their range of applicability to food and beverage packaging. One of the most promising approaches has been the deposition of thin layers of inorganic oxides on the surface of the polymers, either prior to or after mechanically forming the polymer into the finished container. Inorganic oxides, especially silicon dioxide, have been explored extensively, because of their transparency, impermeability, chemical inertness, and compatibility with food and beverages.

Inorganic oxides can be deposited onto a polymeric surface by a number of techniques, including sputtering and various types of vapor deposition including plasma vapor deposition, plasma enhanced chemical vapor deposition, and electron beam or anodic arc evaporative vapor deposition. Although each technique has its own advantages and disadvantages, they all allow the deposition of nanometer-thick layers of the oxide onto the preformed polymer surface. Because of the thinness of the layer, the resulting structures retain most of the physical properties of the base polymer, but can exhibit reduced permeability.

Despite this, commercialization of containers based on polymeric/inorganic oxide multilayer structures has been slow, and is mostly limited to flexible containers made by post-forming coated films. In particular, rigid polymeric containers with inorganic oxide coatings have proven difficult to develop. This is because that, although the deposition of inorganic oxides onto the surface (especially the exterior surface) of a rigid container is not difficult to accomplish, heretofore those containers have not exhibited sufficient reductions in permeability over the uncoated containers. This is in spite of the fact that the inorganic oxide coating is typically deposited over the entire surface of the rigid container.

The reason for this modest decrease in permeability (permeability decrease is equivalent to barrier increase) is due to the presence of residual pinholes in the inorganic oxide layer. Pinholes are created in part by pressurization of containers, such as when containers hold carbonated beverages. The surface area occupied by these pinholes is usually quite small (on the order of less that 1% of the total surface); however, the impact of these pinholes is far greater than their surface area would suggest. This is because diffusion through a polymer occurs in all three spatial dimensions; thus, each pinhole can drain a much larger effective area of the container surface than the actual area occupied by the pinhole.

Because the surface of rigid containers is inherently less smooth than the surface of biaxially oriented films, the pinhole density on coated containers is much greater than that for films. Thus, whereas barrier improvements of 10–100× are possible when biaxially oriented PET film is coated with silicon dioxide; barrier improvements of only 2–3× have been obtained when rigid PET containers are similarly coated and used to hold carbonated beverages. This reduced barrier improvement is due in part to pressurization of the container. In addition, when the silicon oxide layer is on the external surface, it is subject to mechanical degradation on handling of the container, such as that which occurs in normal package filling operations.

Numerous methods have been explored to address this problem. The most common approach has been to deposit thicker layers of the oxide; however, this approach is inherently self-defeating. Thicker layers are less flexible and less extensible than thin layers, and therefore more prone to fracturing under stress. Another method is to apply multiple layers of inorganic oxides, sometimes with intermediate processing to redistribute the pinhole-causing species. This approach also has met with little success, in part because of the greater complexity of the process, and because of its modest impact on barrier improvement. A third method has been to supply an organic sub-layer on the polymer surface to planarize the surface and cover up the pinhole-causing species prior to laying down the inorganic oxide. This method also greatly increases the complexity and cost of the overall process, and similarly only affords modest improvements in barrier performance. A fourth approach has been to melt-extrude a second polymer layer on top of the inorganic oxide layer, and thus provide additional resistance to gas flow through the pinholes. Thus, Deak and Jackson (Society of Vacuum Coaters, 36$^{th}$ Annual Technical Conference Proceedings, 1993, p318) report than applying a 4 micron layer of poly(ethylene-co-vinyl acetate) on top of a PET/SiOx structure improved the barrier property by 3×, and applying a 23 micron top layer of PET improved the barrier performance by 7×.

Despite the barrier improvement demonstrated by Deak and Jackson, there has been little commercial implementation of this approach, for several reasons. First, melt extrusion of a second polymer onto a polymeric/inorganic oxide film imparts substantial thermal stress to the preformed structures, often severely compromising their barrier performance. Second, structures where the two polymers are different are inherently more difficult to recycle than structures composed only one polymer. Third, coextrusion of a second polymer onto preformed rigid containers is nearly impossible with current technology, and is cost prohibitive for large volume applications in the food and beverage industry.

Thus, there is a need for multilayer structures with enhanced barrier performance, especially polymeric/inorganic oxide multilayer structures such as silica coated PET containers.

SUMMARY OF THE INVENTION

This invention solves the above-described problems in the prior art by providing a coated multilayer structure comprising a polymeric base layer, an inorganic oxide gas barrier layer on the surface of the polyermic base layer, and a top coat on the inorganic oxide gas barrier layer comprising a soluble compound capable of reducing the permeability of the multilayer structure to gas or vapor. More particularly, the soluble compound has a plurality of carboxyl, hydroxyl, or carboxamide functional groups, has a melting point above room temperature (25 C), is chemically non-reactive with the inorganic barrier coating, is water soluble, and is non-toxic. The soluble compound of the top coat blocks ingress or egress of gas or vapor through the pinholes. The top coat is particularly suitable for blocking ingress or egress of oxygen and carbon dioxide.

This invention also encompasses a method for enhancing the gas or vapor barrier properties of a multilayer structure comprising a polymeric base layer and an inorganic oxide gas barrier layer on a surface of the polymeric base layer. This method comprises applying to the inorganic oxide gas barrier layer a top coat comprising the above-described soluble compound. Desirably, the soluble compound is applied to the inorganic oxide gas barrier layer in a form of a solution such as an aqueous solution. The multilayer structure is allowed to dry such that the solvent evaporates and the soluble compound remains as a top coat.

The soluble compound of the top coat can be polymeric or monomeric. Suitable polymeric compounds for the top coat include carboxymethyl cellulose, polyacrylamide, polydextrose, polyacrylic acid, and polyvinyl alcohol. Suitable monomeric compounds for the top coat include sucrose, caramel, and citric acid.

The treatment of this invention is particularly useful for enhancing the gas or vapor barrier characteristics of containers such as food or beverage containers. This invention is particularly useful for enhancing the gas or vapor barrier characteristics of packaged beverage containers such as carbonated soft drink containers. According to a particular embodiment, the top coat of this invention is applied to a silica-coated polyethylene terephthalate container.

Other objects, features and advantages of this invention will be apparent from the following detailed description of embodiments, claims, and drawings.

DETAILED DESCRIPTION OF EMBODIMENTS

As summarized above, this invention encompasses multilayer structures comprising a polymeric base layer and an inorganic oxide gas barrier layer on a surface of the polymeric base layer, and a top coat on the inorganic oxide gas barrier layer for reducing the permeability of the multilayer structure to gas or vapor and thereby increasing barrier of the multilayer structure to gas or vapor. This invention also encompasses a method for reducing the permeability of such a multilayer structure to gas or vapor.

Polymeric-inorganic multilayer structures with enhanced gas or vapor barrier properties are particularly useful as food or beverage containers. It is often desirable that food or beverage containers prevent oxygen ingress or carbon dioxide egress. For example, polymer-inorganic oxide containers with enhanced vapor or gas barrier are desirable as packaged beverage containers and are particularly useful as carbonated beverage containers because they retain carbon dioxide better than containers without enhanced vapor or gas barrier.

Figure 1:
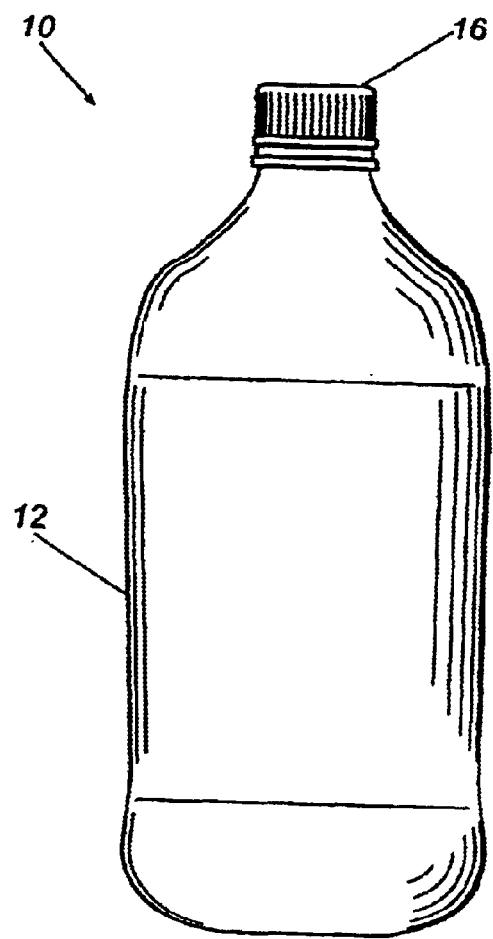
FIG. 1 is an elevation view of a packaged beverage including a container coated with a gas or vapor barrier top coat in accordance with an embodiment of this invention.
Figure 2:
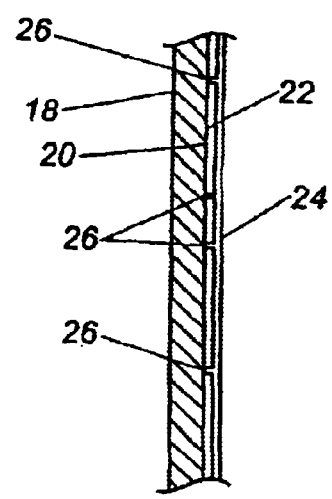
FIG. 2 is a partial sectional view of the container in FIG. 1 illustrating the multilayer structure of the container.

FIG. 1 illustrates a packaged beverage 10 comprising a container body 12, a beverage (not shown) disposed in the container, and a closure or cap 16 sealing the beverage within the container body. FIG. 2 illustrates the multiple layers of the container body including the polymeric base layer 18, the inorganic oxide gas or vapor barrier layer 20 on the exterior surface 22 of the base layer, and a vapor or gas barrier enhancing top coat 24 on the inorganic oxide barrier layer. The top coat 24 illustrated in the FIG. 2 is continuous on the surface of the inorganic oxide barrier coating, but can be discontinuous. The top coat 24 is applied so as to enhances the vapor or gas barrier of the multilayer structure container 12.

Suitable polymers for forming the polymeric base layer 14 of the multilayer structure container 12 can be any thermoplastic polymer suitable for making containers. Polyesters are particularly suitable and polyethylene terephthalate (PET) is commonly used to form beverage containers. Other suitable polyesters include polyethylene naphthalate (PEN), PET/PEN blends, PET copolymers, and the like. Although this invention is applicable to flexible containers, it is most effective on substantially rigid containers.

The inorganic oxide barrier layer 20 reduces the permeability of the container 10 to gas and vapor, particularly carbon dioxide and oxygen. Silica ($SiO_x$) is particularly desirable for beverage containers because it is transparent, chemically inert and compatible with food and beverages. The inorganic oxide barrier coating 20 can be applied to the polymeric base layer 14 by a number of techniques including sputtering and various types of vapor deposition including plasma vapor deposition, plasma enhanced chemical vapor deposition, and electron beam or anodic arc evaporative vapor deposition. Suitable vapor deposition techniques are disclosed in U.S. patent application Ser. No. 09/380,904, filed on Sep. 10, 1999, and corresponding to International PCT Application PCT/US98/05293, and U.S. patent application Ser. No. 09/128,456, filed on Aug. 3, 1998, and corresponding to International PCT Patent Application PCT/US99/15828, the disclosures of which are hereby expressly incorporated herein by reference. These inorganic oxide barrier layers often have pinholes which allow passage of gas and vapor.

The top coat 24 fills the pinholes 26 in the inorganic oxide gas barrier layer and reduces the permeability of the container 12 to gas or vapor. Suitable soluble compounds for forming the top coat are solid at temperature (25 C) and pressure (atmospheric pressure). Desirably, the top coat comprises a water soluble compound containing a large portion of hydroxyl groups, carboxamide groups or carboxylic acid groups for optimal barrier improvements. It is also desirable that the soluble compound for forming the top coat is non-toxic and chemically nonreactive with the inorganic oxide barrier layer.

The top coat can be applied by dissolving the soluble compound in water or another suitable solvent and applying the solution to the inorganic oxide barrier layer of the container by suitable means such as dipping or spraying. When the solvent evaporates, the soluble compound remains in the pinholes of the inorganic oxide barrier layer to block ingress or egress of gas or vapor.

Although there are many solid/solvent combinations that are effective in the operation of this invention, it is preferred that both the solid and solvent be compatible with food and beverages. It is particularly preferred that both the solid and solvent have regulatory approval for use in food-contact. It is especially preferred to use water as the solvent, due to its low cost, non-toxicity, and ease of handling. There are many candidate solids, both polymeric and non-polymeric, that are water soluble, and that are acceptable for food contact. Examples of non-polymeric materials that can improve the barrier performance of polymeric/inorganic oxide structures include sucrose, caramel, and citric acid. Examples of suitable soluble polymeric materials for forming the top coat include carboxymethyl cellulose, poly(acrylamide), polydextrose, poly(acrylic acid), and poly(vinyl alcohol).

Higher concentrations of the soluble solid top coat compound normally afford greater barrier enhancement, but the barrier enhancement levels off eventually as concentrations of the soluble solid top coat compound increase. In contrast, higher molecular weight polymers are not more effective than low molecular weight compounds. Accordingly, it is preferable to employ a higher concentration of a low molecular weight compound, rather than a low concentration of a higher molecular weight compound.

The thickness of the top coat may vary and can be very thin. Some top coats can be applied at a thickness of 50 microns or less and some can be applied at a thickness of 10 microns or less. It should be understood, however, that the thickness of the top coat can be greater than 50 microns.

Specific embodiments of barrier-enhancing treatments of this invention include dipping SiOx-coated PET bottles into an aqueous sucrose solution followed by evaporation of the water, dipping SiOx-coated PET bottles into aqueous solutions of citric acid followed by evaporation of the water, or dipping SiOx-coated PET bottles into aqueous solutions containing poly-hydroxylated polymers. When similar operations are performed on PET that lacks a coating of SiOx, no barrier improvements are observed. It is notable that this effect can be reversible; thus, when a SiOx-coated PET bottle that has been previously treated with a sucrose solution is immersed momentarily in pure water, the barrier enhancement disappears.

In some embodiments, application of the top coat to uncoated polymeric structures such as plastic bottles can enhance gas barrier of the polymeric structures. In direct application of the top coat to polymeric structures, better results are obtained if the uncoated polymeric structure is wetable with the top coat solution. Generally, however, the combination of an inorganic oxide barrier layer with a top coat provides much greater gas barrier.

An additional benefit of this invention is that, in addition to enhancement of the barrier properties of polymeric/inorganic oxide structures, it provides a method to increase the abuse resistance of such structures. Specifically, if film-forming polymeric materials are dissolved in the solution, deposition of those polymers onto the surface of the inorganic oxide layer can increase the abuse resistance of that layer. This is particularly useful in manufacturing packaged beverages because of the necessary mechanical handling of the treated containers.

In the manufacture of packaged beverages, the top coat of this invention can be applied to containers in a continuous packaged beverage manufacturing line between application of the inorganic oxide barrier layer to the container and filling the container with the beverage. Alternatively, the top coat can be applied to the containers after they are filled with beverage. Regardless, the containers treated in accordance with this invention can be used to manufacture packaged beverages in a conventional packaged beverage manufacturing facility.

EXAMPLES

In the following examples, SiOx-coated PET bottles were subjected to various treatments that demonstrate the barrier-enhancing effect of the present invention. These examples are intended to illustrate particular embodiments of this invention, but not limit the scope of this invention. In these examples, the $CO_2$ loss rate was measured by determining the rate that $CO_2$ migrated to the exterior of the bottle, when the bottles were pressurized to 5 bar pressure and held at 38 C. The barrier improvement factor (BIF) was determining by measuring the loss rate for the barrier-coated bottles treated with a topcoat vs. the loss rate for bottles without a barrier coat or a top coat. For example, the BIF of a plain, uncoated PET bottle is 1. Assuming the shelf life of a carbonated beverage packaged in a plain, uncoated PET bottle is about 10 weeks, the shelf life of a carbonated beverage in a coated PET bottle having a BIF of 1.2 would be about 12 weeks, the shelf life of a carbonated beverage in a coated PET bottle having a BIF of 2 would be about 20 weeks, and the shelf life of a carbonated beverage in a coated PET bottle having a BIF of 20 would be about 200 weeks.

Example 1

500 ml PET bottles produced by commercial stretch-blow molding were exterior-coated with a 50 nanometer layer of SiOx, using an anodic-arc plasma vapor deposition process. Before coating, the PET bottles exhibited a $CO_2$ loss rate of 2.7% per week (38 deg Cc, 5 bar pressure). After coating with SiOx, the same bottles exhibited a $CO_2$ loss rate of 1.1% per week. Thus, the coated bottles exhibited a barrier improvement factor (BIF) of 2.5× over the uncoated PET bottles.

Example 2

The SiOx-coated PET bottles from Example 1 were dipped in a 5% sucrose/water solution for 30 seconds, then removed. The remaining water on the bottles was allowed to evaporate, and the $CO_2$ loss rate was again measured. The measured loss rate was 0.54% per week, for a BIF of 5.0, and an enhancement over the untreated bottles of 2×. Uncoated PET bottles treated under the same conditions had a $CO_2$ loss rate of 2.7% per week before and after treatment, showing that the treatment does not improve the barrier properties of PET without an inorganic oxide coating.

Example 3

The SiOx-coated bottles of Example 3 were dipped in clean tap water for 30 seconds, then were removed and allowed to air-dry. The $CO_2$ loss rate was again measured. The measured loss rate was 1.1% per week, the same as measured before exposing the bottles to the sugar solution.

Example 4

SiOx-coated PET bottles exhibiting a BIF of 3.25×($CO_2$ loss rate of 0.86% per week) were dipped into a 5% aqueous solution of low molecular weight carboxymethyl cellulose, and allowed to air dry. The measured $CO_2$ loss rate was 0.32% per week, for a BIF of 8.79× and a barrier enhancement of 2.7× over the untreated bottles.

Example 5

SiOx-coated PET bottles exhibiting a BIF of about 2.27× ($CO_2$ loss rate of 1.19% per week) were tumbled for 1 minute and then dipped into a 5% aqueous solution of low molecular weight carboxymethyl cellulose for 30 seconds and allowed to air dry. The measured $CO_2$ loss rate was 0.52% per week, for a BIF of 5.21×.

Example 6

SiOx-coated PET bottles exhibiting a BIF about 2.27× ($CO_2$ loss rate of 1.19% per week) were dipped into a 5% aqueous solution of low molecular weight carboxymethyl cellulose for 30 seconds and allowed to air dry and then tumbled for 1 minute. The measured $CO_2$ loss rate was 0.63% per week, for a BIF of 4.27×.

Example 7

SiOx-coated PET bottles from Example 1 were dipped into a 1% aqueous solution of poly(acrylamide) and allowed to air dry. The barrier enhancement from this treatment was 1.2×. When this operation was repeated using a 5% aqueous solution of poly(acrylamide) the barrier enhancement obtained was 1.5×.

Example 8

SiOx-coated PET bottles with a BIF of 1.66 were dipped into a 5% aqueous solution of 87% hydrolyzed poly(vinyl alcohol) and allowed to air dry. After this treatment the measured BIF was 2.59×. Thus, the measured barrier enhancement from this treatment was 1.56×.

Example 9

SiOx-coated PET bottles with a BIF of 2.13 were dipped into a 5% aqueous solution of citric acid and allowed to air dry. After treatment, the BIF was 2.69. Thus, the barrier enhancement from this treatment was 1.26×.

Example 10

SiOx-coated PET bottles with a BIF of 1.74 were dipped into a 5% aqueous solution of poly(acrylic acid) and allowed to air dry. The measured barrier BIF after this treatment was 3.30. Thus, the barrier enhancement from treatment with poly(acrylic acid) was 1.89×.

Example 11

An SiOx-coated PET bottle with a BIF of 1.89 was dipped into 5% poly(acrylic acid) and allowed to air dry. The resulting BIF was 3.07. The bottle was then subjected to mechanical abuse by tumbling with other bottles for 60 seconds. After tumbling, the BIF was measured again and was found to be 2.56.

Example 12

An SiOx-coated PET bottle with a BIF of 2.27 was dipped into a 5% carboxymethyl cellulose solution and allowed to air dry. The resulting BIF was 5.33. The bottle was then subjected to mechanical abuse by tumbling with other bottles for 60 seconds. After tumbling, the BIF was measured again and was found to be 4.57.

The following comparative examples illustrate water soluble and water-dispersible compounds and polymers that are not effective in increasing the barrier performance of SiOx-coated PET bottles. These examples illustrate the non-obviousness of the present invention with respect to the prior art, which teaches that any polymeric top-coat over a SiOx-PET multilayer will result in higher barrier.

Comparative Example 1

SiOx-coated PET bottles from Example 1 were dipped into an aqueous suspension of oxidized polyethylene wax and allowed to air dry. The measured $CO_2$ loss rate was 1.1% per week before the treatment, and remained unchanged after the treatment, even though a measurable layer of polyethylene had been deposited onto the surface of the bottle.

Comparative Example 2

SiOx-coated PET bottles were dipped into a 5% aqueous solution of benzoic acid and allowed to air dry. The measured BIF vs. uncoated reference bottles decreased from 2.02× to 1.3×, for a barrier decrease of 36%.

Comparative Example 3

SiOx-coated PET bottles were dipped into a 5% aqueous solution of poly(vinylpyrrolidone) and allowed to air dry. The resulting bottles showed a loss in BIF from 2.2× to 1.9×, or a loss of 14% in barrier.

Comparative Example 4

SiOx-coated PET bottles were dipped into a 5% suspension of Eastman AQ55 water dispersible polyester. Before treatment the bottles had a BIF of 1.80; after treatment the BIF was 1.42.

Comparative Example 5

SiOx-coated PET bottles with a BIF of 2.05 were dipped into a 5% aqueous solution of sodium bicarbonate, and were allowed to air dry. After this treatment the bottles had a BIF of 1.81.

Comparative Example 6

SiOx-coated PET bottles with a BIF of 1.80 were dipped into a 5% aqueous suspension of soluble starch, and were allowed to air dry. After this treatment the bottles had a BIF of 1.37.

Comparative Example 7

SiOx-coated PET bottles with a BIF of 2.04 were dipped into a 5% aqueous solution of poly(ethylene glycol) and were allowed to air dry. After this treatment the bottles had a BIF of 1.40.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A coated multilayer rigid beverage container body comprising:
    a polymeric base layer;
    an inorganic oxide gas barrier layer on an exterior surface of the polymeric base layer, the inorganic oxide barrier layer having pinholes; and
    a top coat on the inorganic oxide gas barrier layer, the top coat at least partially disposed in the pinholes and comprising a water soluble compound wherein the permeability of the rigid container body to gas or vapor is reduced.

2. A coated multilayer rigid container body as in claim 1 wherein the water soluble compound has a carboxyl, hydroxyl, or carboxamide functional group.

3. A coated multilayer rigid container body as in claim 1 wherein the water soluble compound is in a solid state at a temperature of 25° C. and atmospheric pressure.

4. A coated multilayer rigid container body as in claim 1 wherein the water soluble compound is nonreactive with silica.

5. A coated multilayer rigid container body as in claim 1 wherein the water soluble compound is nontoxic.

6. A coated multilayer rigid container body as in claim 1 wherein the inorganic oxide gas barrier layer is an SiOx coating.

7. A coated multilayer rigid container body as in claim 1 wherein the inorganic oxide gas barrier layer is applied to the base layer with vapor deposition or sputtering.

8. A coated multilayer rigid container body as in claim 1 wherein the base layer is a thermoplastic layer.

9. A coated multilayer rigid container body as in claim 1 wherein the base layer is polyethylene terephthalate.

10. A coated multilayer rigid container body as in claim 1 wherein the water soluble compound is a polymeric water soluble compound.

11. A coated multilayer rigid container body as in claim 10 wherein the polymeric water soluble compound is selected from the group consisting of carboxymethyl cellulose, poly(acrylamide), polydextrose, poly(acrylic acid), and poly(vinyl alcohol).

12. A coated multilayer rigid container body as in claim 1 wherein the water soluble compound is a monomeric water soluble compound.

13. A coated multilayer rigid container body as in claim 12 wherein the monomeric water soluble compound is selected from the group consisting of sucrose, caramel, and citric acid.

14. A coated multilayer rigid container body as in claim 1 wherein the water soluble compound is applied to the inorganic oxide gas barrier layer in an aqueous solution.

15. A coated multilayer rigid container body as in claim 14 wherein the water soluble compound, when in the aqueous solution, is in the form of molecules having a maximum dimension less than one micron.

16. A packaged beverage comprising the rigid beverage container body as in claim 1 and a beverage disposed in the rigid container body.

17. A packaged beverage as in claim 16 wherein the beverage is a carbonated beverage.

18. A coated multilayer beverage container body comprising:
   a polymeric base layer;
   an inorganic oxide gas barrier layer on a surface of the polymeric base layer; and
   a top coat on the inorganic oxide gas barrier layer, the top coat comprising a polymeric soluble compound wherein the permeability of the multilayer structure to gas or vapor is reduced, wherein the polymeric soluble compound is selected from the group consisting of carboxymethyl cellulose, poly(acrylamide), and polydextrose.

19. A coated multilayer beverage container body comprising:
   a polymeric base layer;
   an inorganic oxide gas barrier layer on a surface of the polymeric base layer; and
   a top coat on the inorganic oxide gas barrier layer, the top coat comprising a monomeric water soluble compound wherein the permeability of the multilayer structure to gas or vapor is reduced.

20. A coated multilayer structure as in claim 19 wherein the monomeric water soluble compound is selected from the group consisting of sucrose, caramel, and citric acid.

21. A coated multilayer rigid beverage container body comprising:
   a polymeric base layer;
   an inorganic oxide gas barrier layer on an exterior surface of the polymeric base layer; and
   a top coat on the inorganic, oxide gas barrier layer, the top coat comprising a monomeric water soluble compound wherein the permeability of the rigid container body to gas or vapor is reduced.

22. A coated multilayer rigid container body as in claim 21 wherein the monomeric water soluble compound is selected from the group consisting of sucrose, caramel, and citric acid.

* * * * *